Oct. 11, 1927.

E. H. BURKS

CULTIVATOR KNIFE

Filed July 14, 1926

Inventor
E. H. Burks

Patented Oct. 11, 1927.

1,645,039

UNITED STATES PATENT OFFICE.

EDWIN H. BURKS, OF TRENT, TEXAS.

CULTIVATOR KNIFE.

Application filed July 14, 1926. Serial No. 122,361.

The invention relates to cultivator knives, and has for its object to provide diverging horizontally disposed cutter knives having their forward edges sharpened, and which knives may be easily and quickly attached to a cultivator and moved through the ground for severing roots and weeds below the surface of the ground, thereby insuring the killing of the weeds.

A further object is to provide the forward ends of the blades with outwardly extending cutting edges, the inner portions of which are upturned, and the outer ends of which terminate in downwardly extending substantially V-shaped cutters which not only cut roots and weeds but break up the dirt to a certain extent and insure the passing of the blades into the ground, as the cultivator moves forwardly.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

Figure 1:
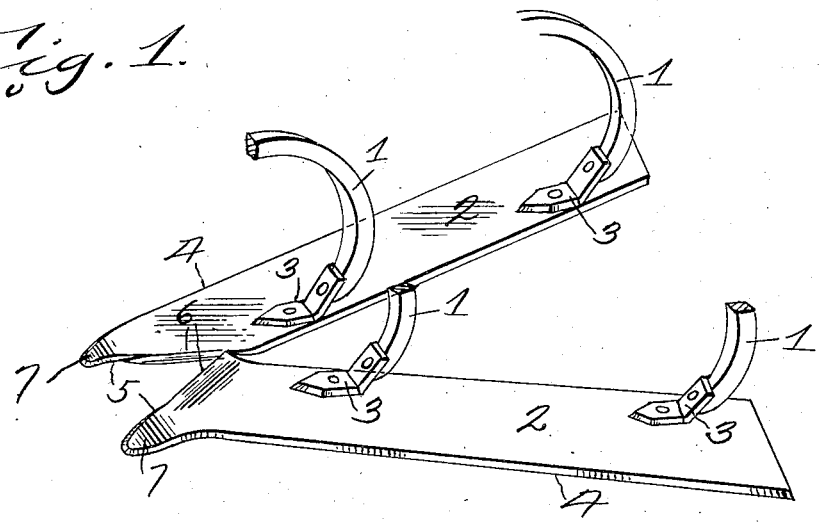
Figure 1 is a perspective view of the weed cutting blades.
Figure 2:
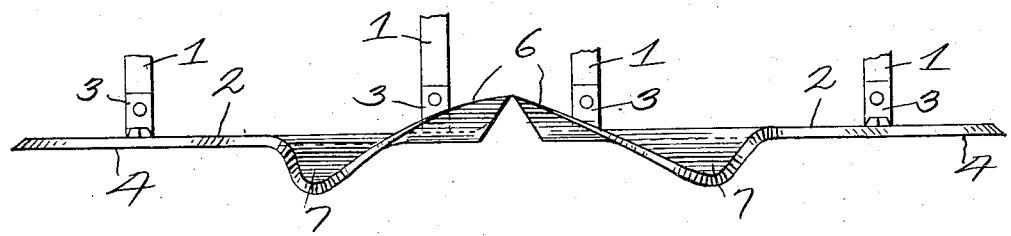
Figure 2 is a front elevation of the weed cutting blades.
Figure 3:
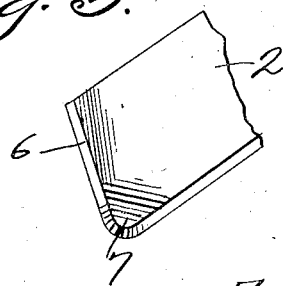
Figure 3 is a top plan view of the forward end of one of said blades.

Referring to the drawing, the numeral 1 designates a plurality of cultivator arms, which are of the usual construction, and 2 diverging weed and root cutter blades which are connected to said arms by means of brackets 3. The outer edges 4 of the blades 2 are sharpened as clearly shown in Figure 2, and the forward ends of the blades 2 are provided with forwardly diverging cutting edges 5, which cut the dirt and weed or roots as the blades move forwardly, beneath the surface of the ground. Cutting edges 5 are provided with rearwardly extending upwardly turned cutting edges 6, which edges increase the cutting operation and at the same time turns the dirt slightly upwardly, and where the blades are used in spaced relation at their forward ends, for instance when the blades are on opposite sides of the row of plants, the dirt will be broken up adjacent the plants. In devices of this character a great deal of difficulty has been experienced to get the blades, which are relatively long, to enter the ground and remain thereunder, as no means has been provided for insuring the starting of the blades into the ground, and to accomplish this result the forward extreme ends of the blades 2 are provided with downwardly curved portions 7, which portions deflect the blades downwardly upon the starting of the cultivator, thereby insuring the burying of the blades into the ground the desired distance where they will sever roots and weeds. Although the device has been described for use beneath the surface of the ground, it is obvious it will work just as well above the surface of the ground for cutting weeds, that is when the edges are relatively sharp, as there is a positive shearing operation as the device moves forwardly over the ground.

From the above it will be seen that cultivator knives are provided which may be easily attached to a conventional form of cultivator and the same is positive in its operation, the parts reduced to a minimum and the burying of the forward end of the blades in the ground takes place immediately upon the forward movement of the cultivator incident to the downwardly and forwardly extending portions 7 which immediately bury themselves in the ground.

The invention having been set forth what is claimed as new and useful is:—

A weed cutter comprising horizontally disposed rearwardly diverging knives, cutter edges carried by the outer sides of said knives, diverging cutter edges carried by the forward ends of the knives, said diverging cutter edges having rearwardly converging upturned portions, the rear ends of the upturned converging portions substantially engaging each other, the forward ends of said diverging cutter edges being carried by downwardly and forwardly extending V-shaped portions of the forward corners of the blades.

In testimony whereof I hereunto affix my signature.

EDWIN H. BURKS.